US011196629B2

(12) United States Patent
Tedaldi et al.

(10) Patent No.: US 11,196,629 B2
(45) Date of Patent: *Dec. 7, 2021

(54) LEARNING ROBUST AND ACCURATE RULES FOR DEVICE CLASSIFICATION FROM CLUSTERS OF DEVICES

(71) Applicant: Cisco Technology, Inc., San Jose, CA (US)

(72) Inventors: David Tedaldi, Zurich (CH); Grégory Mermoud, Venthône (CH); Pierre-Andre Savalle, Rueil-Malmaison (FR); Jean-Philippe Vasseur, Saint Martin D'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/142,447

(22) Filed: Jan. 6, 2021

(65) Prior Publication Data

US 2021/0126833 A1 Apr. 29, 2021

Related U.S. Application Data

(63) Continuation of application No. 16/459,834, filed on Jul. 2, 2019, now Pat. No. 10,917,302.

(60) Provisional application No. 62/860,243, filed on Jun. 11, 2019.

(51) Int. Cl.
*H04L 12/24* (2006.01)
*H04L 12/26* (2006.01)

(52) U.S. Cl.
CPC .......... *H04L 41/0893* (2013.01); *H04L 41/32* (2013.01); *H04L 43/04* (2013.01); *H04L 43/065* (2013.01); *H04L 43/08* (2013.01)

(58) Field of Classification Search
CPC ... H04L 41/0893; H04L 41/32; H04L 43/065; H04L 43/04; H04L 43/08; H04L 43/10; H04L 43/0876
See application file for complete search history.

(56) References Cited

U.S. PATENT DOCUMENTS 8,103,611 B2   1/2012   Tuzhilin et al.
9,785,953 B2  10/2017   Desal et al.
9,959,563 B1   5/2018   Wu et al.
(Continued)

FOREIGN PATENT DOCUMENTS

JP    2008033819     2/2008
WO   WO-2008104742   9/2008

OTHER PUBLICATIONS

Strecht, Pedro, "A Survey of Merging Decision Trees Data Mining Approaches", 10.13140/2.1.3987.4880. ResearchGate, Jan. 2015.

*Primary Examiner* — Nicholas R Taylor
*Assistant Examiner* — Tania M Pena-Santana
(74) *Attorney, Agent, or Firm* — Behmke Innovation Group; James M. Behmke; James J. Wong

(57) ABSTRACT

In various embodiments, a device classification service obtains traffic telemetry data for a plurality of devices in a network. The service applies clustering to the traffic telemetry data, to form device clusters. The service generates a device classification rule based on a particular one of the device clusters. The service receives feedback from a user interface regarding the device classification rule. The service adjusts the device classification rule based on the received feedback.

20 Claims, 11 Drawing Sheets

(56) References Cited

U.S. PATENT DOCUMENTS

| | | |
|---|---|---|
| 2005/0152288 A1* | 7/2005 | Datla ................. H04L 41/0613 |
| | | 370/256 |
| 2007/0244690 A1 | 10/2007 | Peters |
| 2016/0140208 A1 | 5/2016 | Dang |
| 2018/0114123 A1 | 4/2018 | Kim et al. |
| 2018/0227176 A1* | 8/2018 | Ponnuswamy ......... H04L 41/16 |
| 2018/0234472 A1* | 8/2018 | Malakar ................. H04L 69/24 |
| 2018/0259989 A1* | 9/2018 | Li ........................... G06F 30/20 |
| 2018/0300180 A1* | 10/2018 | Shepard .............. G06F 11/0793 |
| 2020/0162425 A1 | 5/2020 | Vasseur et al. |
| 2020/0336397 A1 | 10/2020 | Tedaldi et al. |

\* cited by examiner

LEARNING ROBUST AND ACCURATE RULES FOR DEVICE CLASSIFICATION FROM CLUSTERS OF DEVICES

RELATED APPLICATION

The present application is a continuation of U.S. application Ser. No. 16/459,834, filed on Jul. 2, 2019, which claims priority to U.S. Provisional Patent Application No. 62/860,243, filed on Jun. 11, 2019, both entitled "LEARNING ROBUST AND ACCURATE RULES FOR DEVICE CLASSIFICATION FROM CLUSTERS OF DEVICES" by Tedaldi et al., the contents of each which are incorporated by reference herein.

TECHNICAL FIELD

The present disclosure relates generally to computer networks, and, more particularly, to learning robust and accurate rules for device classification from clusters of devices.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular device is known to the network. For example, the network may limit a particular type of sensor to only communicating with its supervisory device. Typically, this classification is made by observing the behavior of the device during a short period of time after joining the network (e.g., the first minute) and applying a device classification rule to the observed behavior.

Typically, device classification rules today are curated by human experts and manually defined. Consequently, testing has shown that up to 40% of devices today are classified as being of an unknown device type. As disclosed herein, the recent proliferation of machine learning techniques now makes it possible to automate the rule creation process, which can significantly reduce this percentage. However, verification and validation of a rule after creation is challenging, leading to the potential for the creation of rules that are not robust and/or accurate. In addition, when machine learning clustering is used to generate device classification rules, cluster instability can also lead to reduced accuracy and misclassifying some devices.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
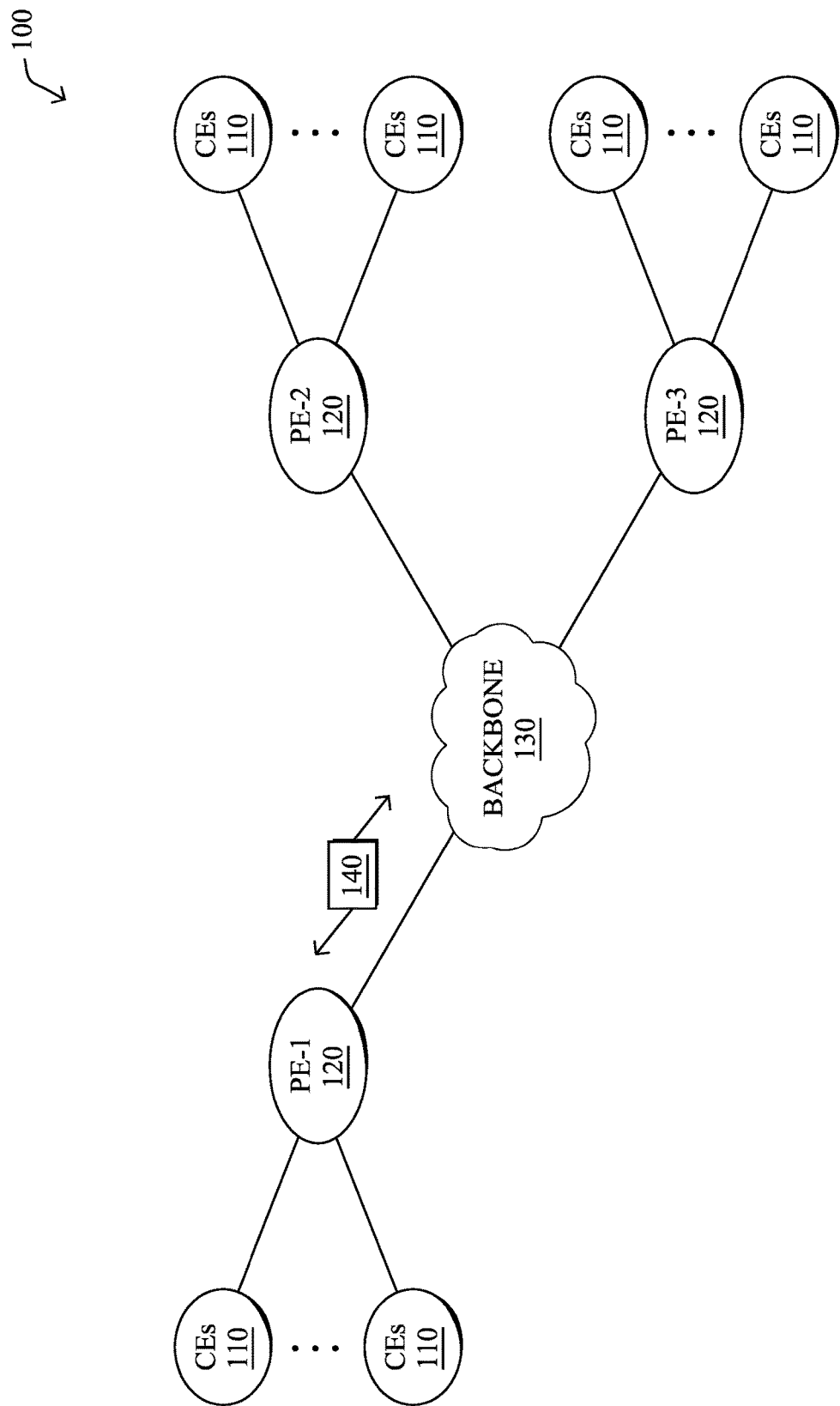
FIGS. 1A-1B illustrate an example communication network.

According to one or more embodiments of the disclosure, a device classification service obtains traffic telemetry data for a plurality of devices in a network. The service applies clustering to the traffic telemetry data, to form device clusters. The service generates a device classification rule based on a particular one of the device clusters. The service receives feedback from a user interface regarding the device classification rule. The service adjusts the device classification rule based on the received feedback.

In further embodiments, a device classification service applies a first clustering approach to the traffic telemetry data, to form a first set of device clusters. The service provides data regarding one of the device clusters in the first set to a user interface. The service receives feedback from the user interface regarding the device cluster in the first set that indicates that the cluster should be broken up. The service applies a second clustering approach to the traffic telemetry data, to form a second set of clusters, wherein the second set of clusters comprises more device clusters than that of the first set.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B 1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
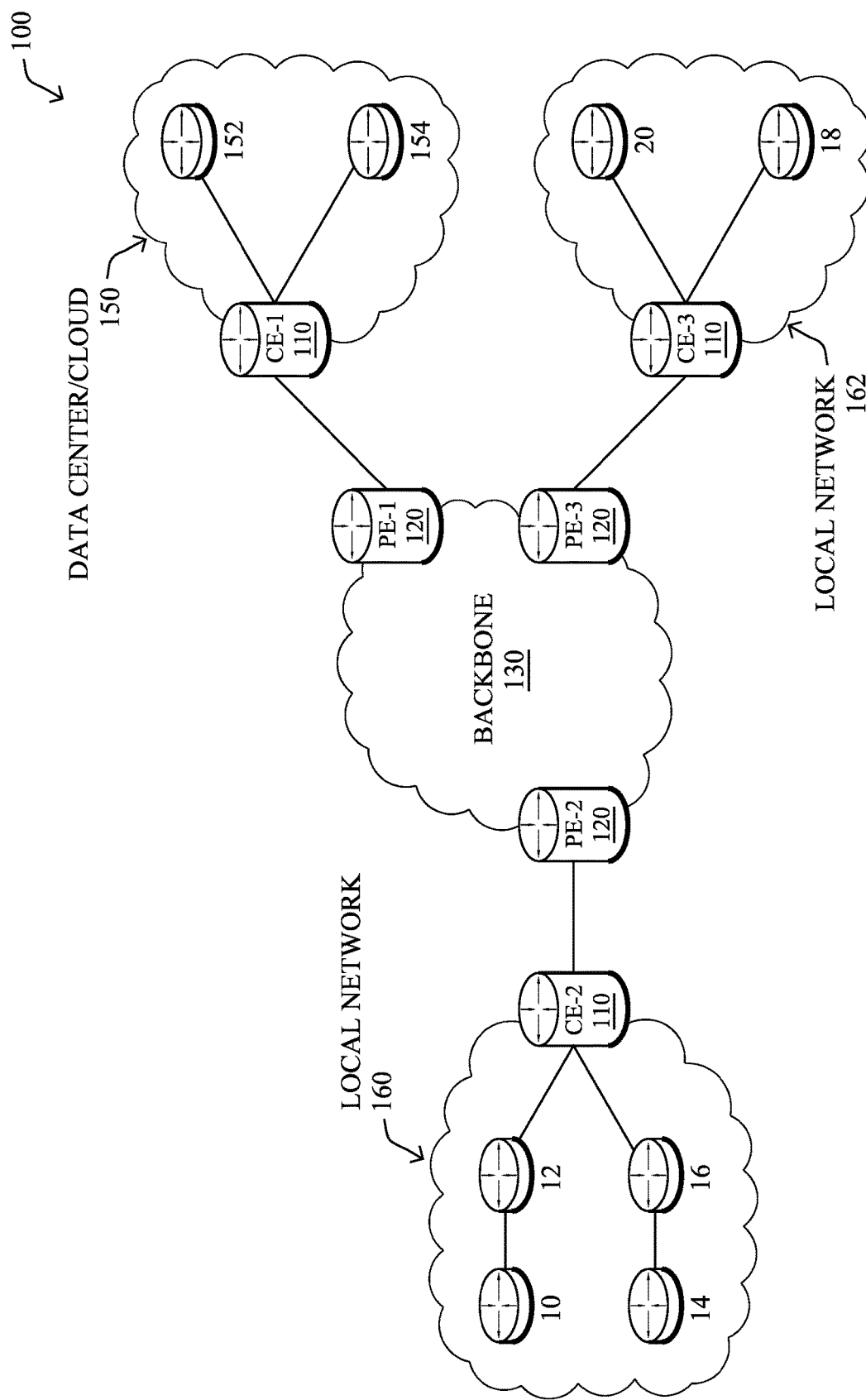

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
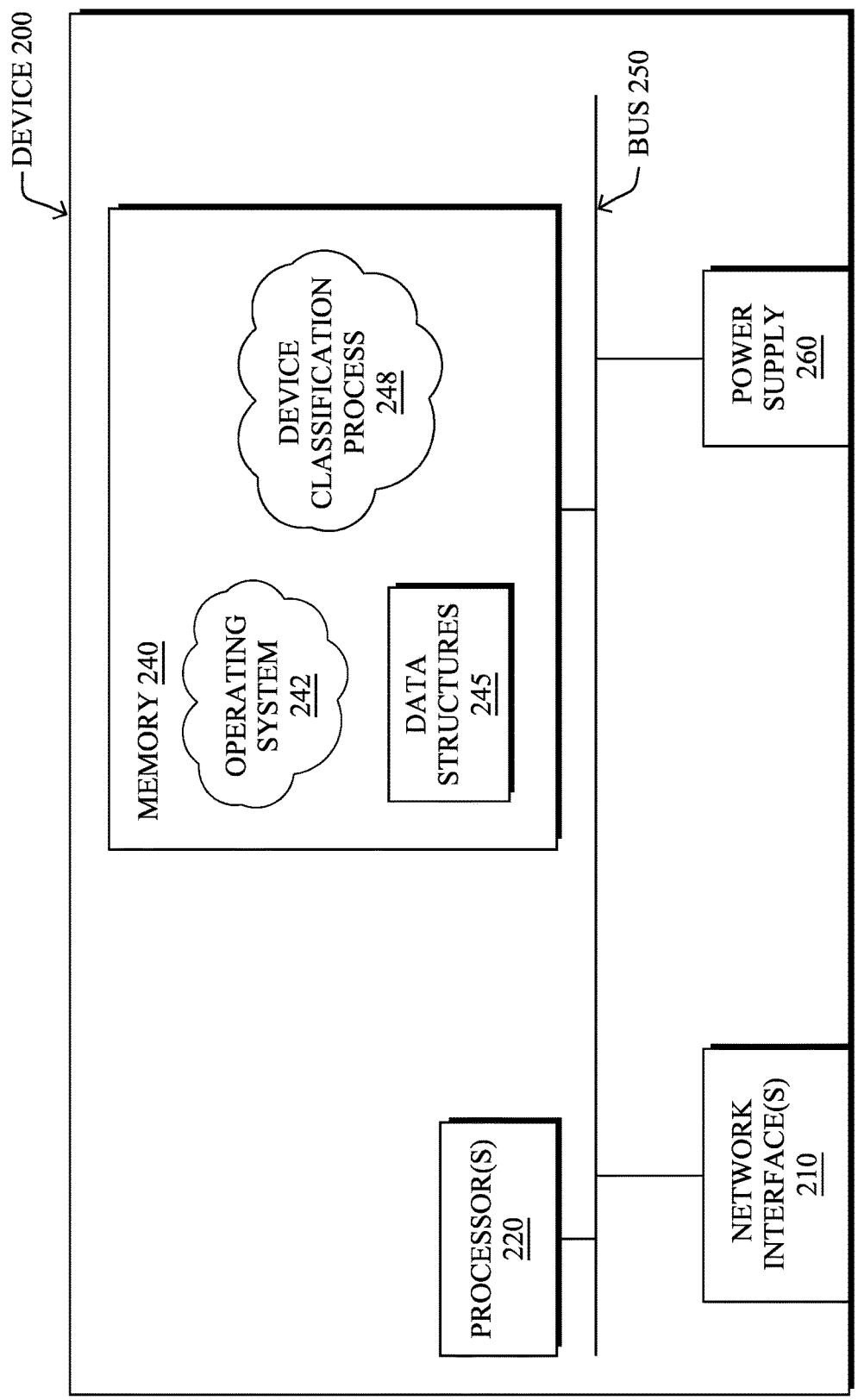
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
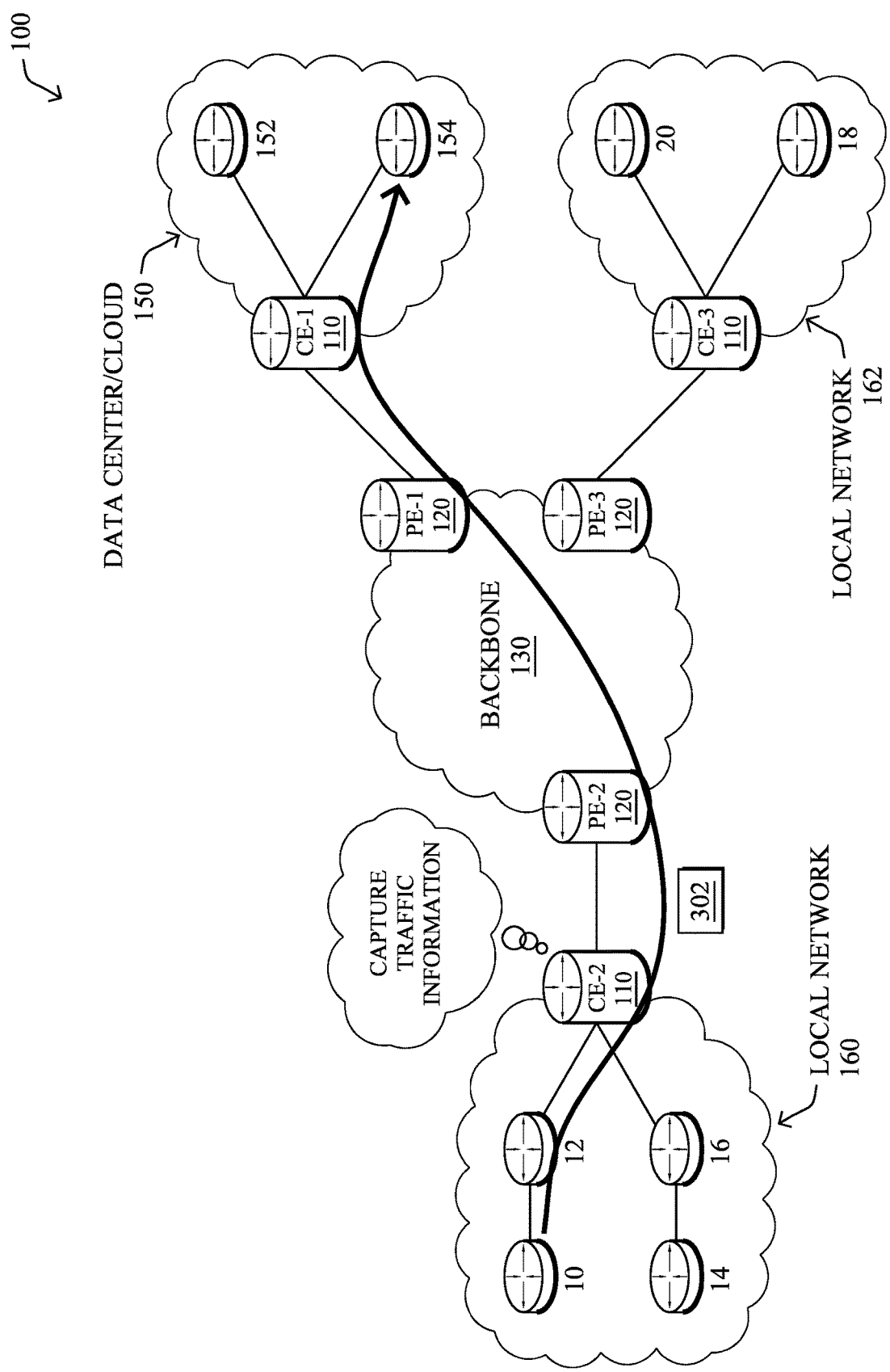
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture telemetry data about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example features in the captured telemetry data may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

Figure 4:
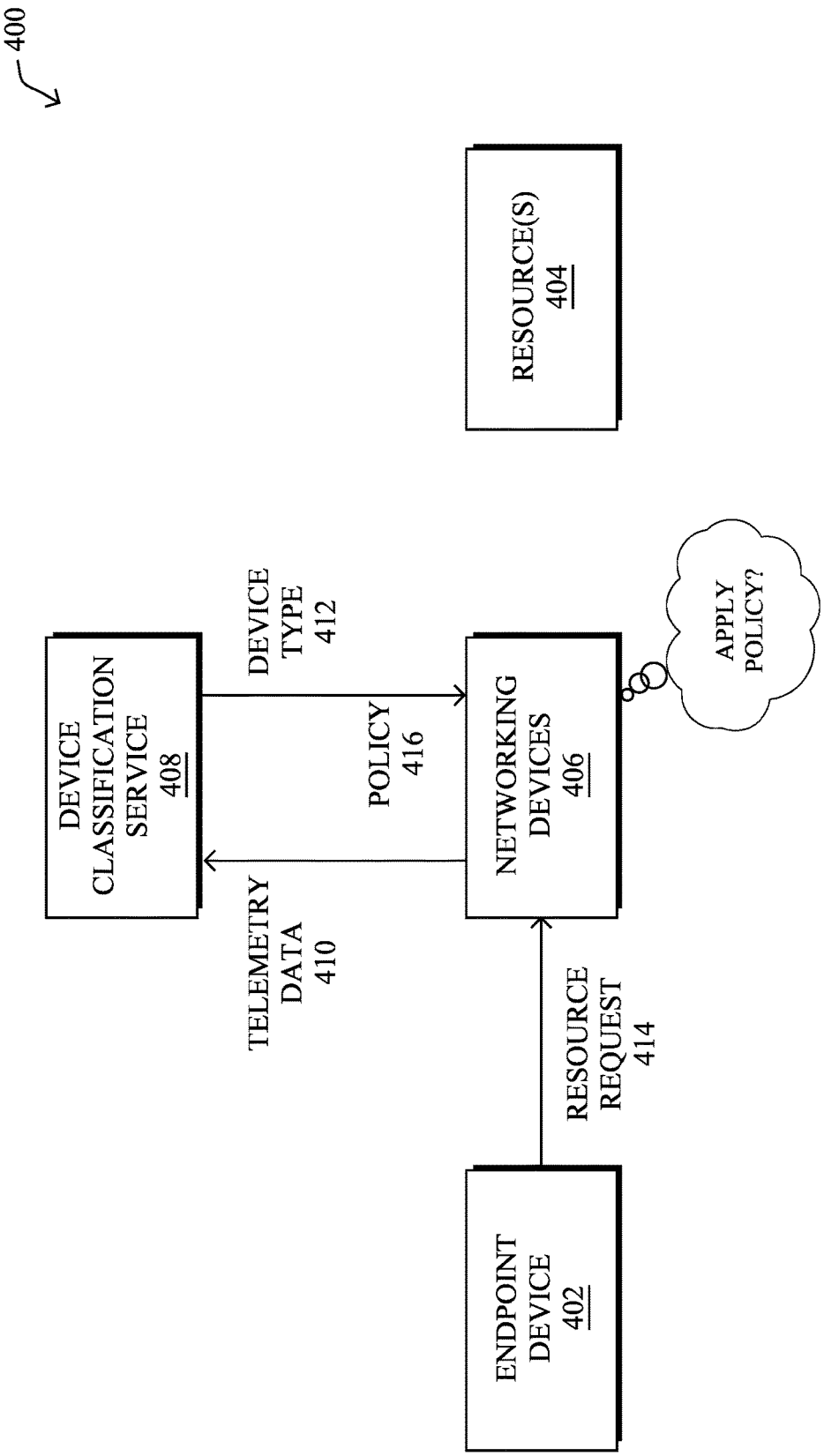
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also as shown in FIG. 4 is a device classification service 408 that may be hosted on one or more of networking devices 406 or be in communication therewith. Service 408 may, for example, be provided through the execution of device classification process 248, described above. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model/version (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy 416 associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:

DHCP probes with helper addresses
SPAN probes, to get messages in INIT-REBOOT and SELECTING states, use of ARP cache for IP/MAC binding, etc.
Netflow probes
HTTP probes to obtain information such as the OS of the device, Web browser information, etc.
RADIUS probes
SNMP to retrieve MIB object or receives traps
DNS probes to get the Fully Qualified Domain Name (FQDN)
etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

Figure 5:
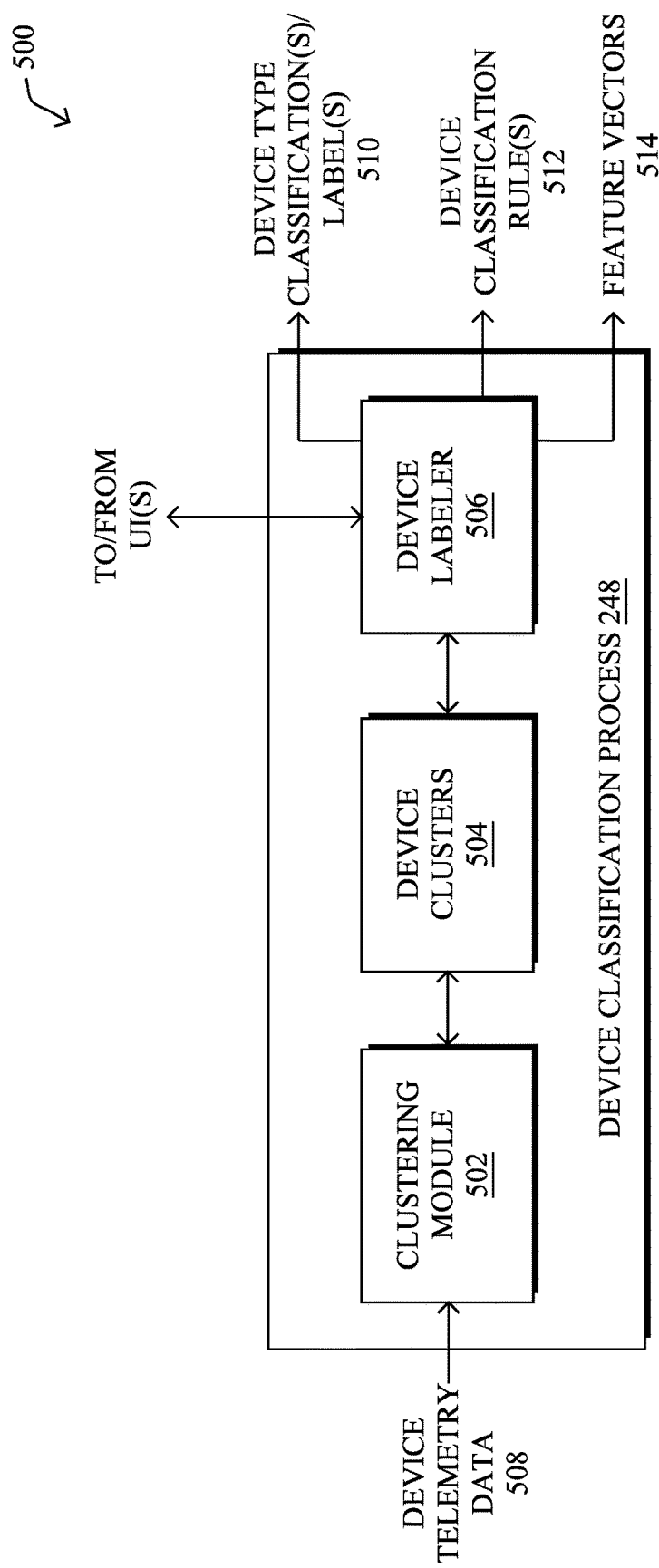
FIG. 5 illustrates an example architecture for a device classification process.

FIG. 5 illustrates an example architecture 500 for device classification process 248, according to various embodiments. As shown, device classification process 248 may include any or all of the following components: clustering module 502, device clusters 504, and/or a device labeler 506, to provide a device classification service to one or more networks. These components 502-506 may be implemented in a distributed manner or implemented on a single device. In addition, some or all of components 502-506 may be implemented as part of a monitored network (e.g., at the network edge) or part of a cloud-based device classification service. For example, in some implementations, a cloud-based device classification service may perform centralized rule generation for any number of networks that perform the classifications locally. The functionalities of the components of architecture 500 may also be combined, omitted, or implemented as part of other processes, as desired.

As shown, device classification process 248 may receive device telemetry data 508 regarding any number of devices undergoing device type classification. Such device telemetry data 508 may include, for example, the MAC addresses of the devices, traffic features captured from the devices' traffic (e.g., which protocols were used, source or destination information, etc.), timing information (e.g., when the devices communicate, sleep, etc.), and/or any other information regarding the devices that can be used to infer their device types. For example, device telemetry data 508 may take the form of a feature vector in which each dimension represents the presence or absence of a certain protocol in the traffic of the device such as, but not limited to, IPv6, IPv4, IGMPv3, IGMPv2, ICMPv6, ICMP, HTTP/XML, HTTP, etc.

In turn, device classification process 248 may output a device type classification/label 510 for a device under scrutiny, thereby allowing the receiving entity to apply network policies to the device, based on its device type classification(s)/label(s) 510. For example, one such network policy may cause a networking device to prevent an MRI machine from accessing the Internet or another resource via the network.

In various embodiments, the components 502-506 of device classification process 248 may leverage active learning, to assign device type classification(s)/label(s) 510 to the devices under scrutiny. To do so, clustering module 502 may assign the devices under scrutiny to device clusters 504, based on their telemetry data 508. For example, a device cluster 504 may include those devices that exhibit the same or similar traffic or other behavioral features. If a device type is then associated with a device cluster 504, device labeler 506 may apply that type to a device as device type classification 510. In cases in which device labeler 506 is unable to classify the cluster 504 with sufficient confidence, it may send a label request to a user interface (UI), seeking active labeling of that cluster. In other words, device classification process 248 may be configured to leverage active learning, to learn the labels of unknown devices over time. Note also that the pool of device telemetry data 508 may be from any number of networks and that device labeler 506 may seek labels for a device cluster 504 from any number of experts across any number of networks, as well. Once the cluster is labeled by an expert, device labeler 506 can then apply that label to any other devices that fall within that cluster, as well.

More formally, let $D=\{D_1, D_2, \ldots, D_N\}$ denote the set of devices seen on the one or more networks under analysis by device classification process 248, each of which is identified by its MAC address or another unique identifier. For every device $D_i$ at time t, clustering module 502 may construct a feature vector $X_{i,t}$ from the telemetry data 508 for the device. Clustering module 502 may then apply a clustering algorithm, such as DB-scan, k-means, k-medoids, etc., to create a set of device clusters 504. Let $C_t=\{C_{1,t}, \ldots, C_{K,t}\}$ denote these cluster, where $C_{j,t}$ is the $j^{th}$ set of devices clustered together at time t. As would be appreciated, the number of clusters K is typically smaller, or at most equal, to the number of points N, and the collection of clusters C defines a partition of the set of devices D. In doing so, each device represented in a device cluster 504 may exhibit similar behaviors as those of the other devices in its cluster.

Clustering module 502 may perform the device clustering periodically at a relatively high frequency (e.g., hourly) or at a lower frequency (e.g., weekly). Clustering module 502 can also produce subsequent clustering either by performing new clustering from scratch or by leveraging warm-starting techniques whereby $C_{t+1}$, is obtained by running the algorithm on data corresponding to that time point, but using an initialization based on $C_t$. Whether clustering module 502 uses warm-starting can have a large impact on the 'trajectory' of the clustering and is an important design consideration.

In various embodiments, device classification process 248 may also reclassify a device periodically, at a predefined time, or in response to a request to do so. For example, as the device under scrutiny uses the network, additional device telemetry data 508 can be captured. Generally speaking, the more telemetry data regarding the behavior of the device, the greater the accuracy of the resulting device type classification/label 510. Indeed, there may be slight behavioral differences between devices of different types, leading device classification process 248 to misclassify the device, initially, but correct this misclassification later on in time, as more information about the device becomes available.

According to various embodiments, device labeler 506 may also be configured to generate a device classification rule 512 for a given device cluster 504, based on its associated telemetry data 508, represented as positive and negative feature vectors 514, and the device type labels obtained from experts through active learning. For example, device labeler 506 may aggregate the labels obtained from the experts, to form a finalized device type classification label 510 for the device cluster 504, using any number of conditions (e.g., whether a threshold number of the labels agree, the majority of labels, etc.). In turn, device labeler 506 may associate this label with the telemetry data 508 representative of the device cluster 504, such as the centroid of the cluster, etc.

By generating a device classification rule 512, device labeler 506 can then use this rule to quickly assess the telemetry data for new devices on the network(s). In addition, device labeler 506 can also deploy device classification rule 512 to any number of Identity Service Engines (ISEs) and/or device classification services in the network(s), to perform the device classifications locally. This allows every new device appearing on the network and matching device classification rule 512 to be identified with the corresponding device type.

In practice, device classification rules 512 can be specified manually and/or automatically generated by device classification process 248. This leads to the very real possibility of at least some device classification rules 512 conflicting. For example, a manually-defined rule in a network under scrutiny may conflict with another rule that was automatically generated, other manually-defined rules in the network or other networks. etc.

For purposes of illustration, a device classification rule 512 may take the form of a pair (R, L) where R is a logical statement whose free variables are device attributes that specify whether the device type label L should be applied to a given device (e.g., if the attributes of the device satisfy R). Typically, the label L is a structured object of the form {manufacturer, hardware, software}, for instance, {Apple, iPhone 8, iOS 12.1.23}. In practice, R can be thought of as a low-dimensional manifold in the N-dimensional space spawned by all N attributes that a given device can have, such as its organizationally unique identifier (OUI), HTTP user agent, DHCP parameters, application usages, etc.

As noted above, device identification is without any doubt a major and critical component of any Secure Network Access solution. For example, the Identification Service Engine (ISE) by Cisco Systems, Inc., is usually used to apply policies and consequently make use of various form of micro-segmentation. A very common approach for allocating policies lies in determining the device type. Most device classification systems (DCS) rely on simple rules and heuristics to classify devices. Those heuristics are not always enough for classifying consumer devices, in fact, those often fail on more specific and rarer devices. For example, IoT devices are often particularly difficult to classify (because they are usually unknown from IT policy enforcement and classification systems), with a multitude of medical or industrial devices that cannot be identified by traditional systems. For those devices, foolproof rules where one can clearly identify the device type in one of the messages from the device's traffic usually does not exist.

Learning Robust and Accurate Rules for Device Classification from Clusters of Devices The techniques herein introduce device rule generation techniques that relies exclusively on the output of a clustering engine, thus eliminating the need for expert or user supervision. Feedback about the generated rules can also be collected at the same time devices labels are provided by the user. This feedback may then be used to validate or further refine the generated rules.

Specifically, according to various embodiments herein, a device classification service obtains traffic telemetry data for a plurality of devices in a network. The service applies clustering to the traffic telemetry data, to form device clusters. The service generates a device classification rule based on a particular one of the device clusters. The service receives feedback from a user interface regarding the device classification rule. The service adjusts the device classification rule based on the received feedback.

Illustratively, the techniques described herein may be performed by hardware, software, and/or firmware, such as in accordance with the device classification process 248, which may include computer executable instructions executed by the processor 220 (or independent processor of interfaces 210) to perform functions relating to the techniques described herein.

Figure 6:
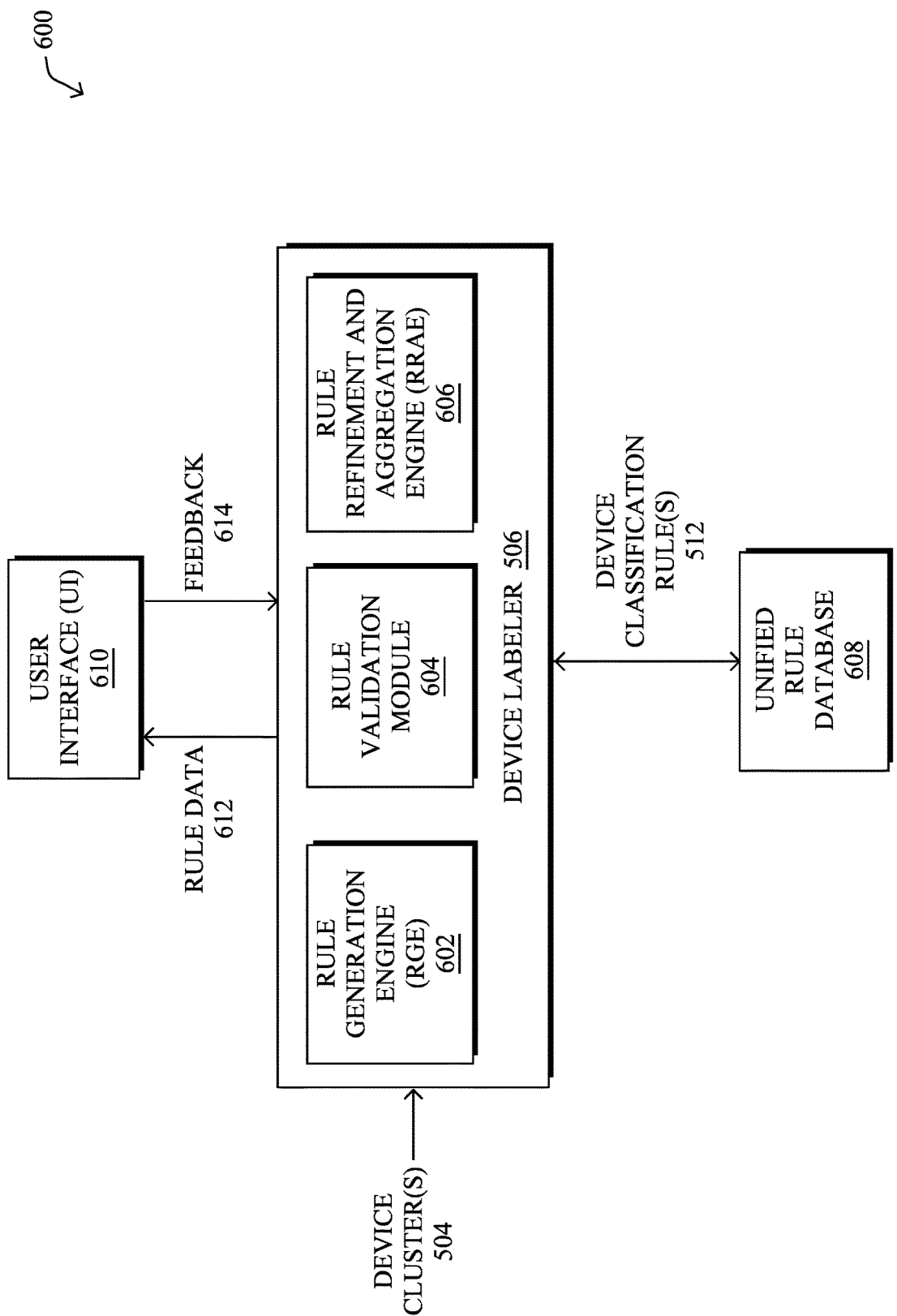
FIG. 6 illustrates an example architecture for device classification rule generation and refinement.

Operationally, in various embodiments, FIG. 6 illustrates an example architecture 600 for device classification rule generation and refinement, according to various embodiments. At the core of architecture 600 may be device labeler 506, described previously, which is responsible for generating device classification rule(s) 512. As shown, device labeler 506 may comprise any or all of the following components: a rule generation engine (RGE) 602, a rule validation module 604, and/or a rule refinement and aggregation engine (RRAE) 606. In addition, in some embodiments, architecture 600 may also include a unified rule database (URD) 608. The components 602-608 may be implemented either on a single device or in a distributed manner, in which case the combined devices may be viewed as a singular device for purposes of implementing the techniques herein. For example, in some embodiments, URD 608 may be hosted in the cloud, while device labeler 506 may be hosted locally in the network under scrutiny or also in the cloud. Further, the functionalities of the components of architecture 600 may also be combined, omitted, or implemented as part of other processes, as desired.

In various embodiments, unified rule database (URD) 608 may receive and store device classification rules, such as device classification rule(s) 512 from device labeler 506, hardcoded/manually-defined rules from other systems, etc., maintained by any number of device classification services across any number of different networks. Such device classification rule data may be provided to URD 608 including the rule itself, as well as potentially associated metadata such as an identifier of the source of the rule, a timestamp of its creation, and/or an optional indicator of confidence assigned by the creator of the rule. Consequently, URD 608 may include potentially hundreds of millions of rules spanning millions of device types. These rules may also originate from various approaches, such as third-party systems, other manually created rules, rules created via active labeling, third party software development kits (SDKs) or application programming interfaces (APIs) of device vendors or the like.

An important feature of URD 608 is its extensibility: connectors and collectors for new data sources can be easily added, even though their role remains always the same, that is, consuming classification rules in some arbitrary format and convert them to the universal format supported by URD 608. Additionally, a field in URD 608 may keep track of the origin of the rules (e.g., internal system, user-driven ML rules, . . . ) from the device classification rule data, in addition to some metrics tracking the number of times the rule was involved in some form of conflict with other rules.

In various embodiments, any device that does not satisfy any of the rules contained in URD 608 may be flagged as 'UNKNOWN' and passed on to device classification process 248, described previously, which is configured to generate new device classification rules 512 through execution of device labeler 506. As noted, device classification process 248 may repartitioning the unknown devices into groups/clusters 504 of similar devices via clustering. In addition, device classification process 248 may also dynamically compute the common attributes of the devices. Both the clusters and common attributes (e.g., as computed by clustering module 502) can be used for purposes of rule generation and refinement.

As shown, rule generation engine (RGE) 602 may be responsible for learning device classification rules that clearly identify the devices belonging to a cluster, in exclusion of all the other devices. The approach used by RGE 602 is to create one dataset for each device cluster 504, in which the samples are partitioned into two categories: (1) the in-cluster devices and (2) the not-in-cluster devices, thus leading to a supervised binary classification problem. This is a form of one-vs-rest multi-class classification.

In one embodiment, RGE 602 may generate a rule based on statistics of the most salient common attributes, which may be included in the information for device cluster 504. In other words, it is possible to build rules by looking at the distribution of the values of some common attributes for those devices belonging to the cluster and those that do not belong to the cluster under consideration and find which attributes' values help to tell devices apart. In another embodiment, RGE 602 may learn a binary classifier, for example, by means of a single decision tree, which is very useful to generate interpretable rules, or some other more complex model.

In a second phase, RGE 602 may infer a device classification rule 512 by introspecting the model, that is, by understanding the decision taken by the model at prediction time. In the case of a simple decision tree, this can be straightforwardly implemented by analyzing the split nodes in the tree. Said differently, the labels assigned using active labeling via a user interface (UI) 610 may then be used by RGE 602 to train a model capable of generating a device classification rule 512.

Regardless of the precise approach taken by RGE 602 in building a rule 512, one key requirement is to generate rules 512 that are both robust and accurate. Robustness refers to how sensitive the generated rule 512 is to the very dataset used to infer it, or, in other words, how likely a rule 512 is to change its exact conditions and its structure depending on the variation of the dataset. Accuracy refers to how often the rule makes mistakes. It is important to estimate both robustness and accuracy for each rule 512. Those two scores can be combined into one confidence score, sometimes referred to as the Total Certainty Factor (TCF).

In order to achieve both robustness and accuracy, given a cluster 506 and its corresponding dataset, RGE 602 may generate K different datasets by means of some resampling technique. Each of these datasets may be further split by RGE 602 into training and test dataset and a rule learned on the training set while being tested and scored on the test set. This yields K-number of rules with associated performance statistics (e.g., accuracy, precision, recall, or others). At this stage, RGE 602 may estimate the robustness of the generated rules by looking at the common conditions and similarity in the structure of the K-number of rules. In the ideal case, the K generated rules would all be exactly the same one, giving a robustness score of 100%. Finally, RGE 602 may analyze and combine the K-number of rules into one cluster-rule, whose performance is estimated by combining the statistics of the individual rules. The so-obtained rules and their scores can be passed over to the next component(s).

It is important to notice that the techniques herein can be easily extended to hierarchical clustering solutions, as well, where a hierarchy of rules can be learned in a way very similar to the one presented here, on the precomputed cluster-breakdowns.

One final comment must also be made about the optimization of the hyper-parameters of the learned model of RGE 602. It is important to tune the model parameters in a way that the rules inferred from the trained model itself will not be overly complex. The reason is that, if the models are allowed to be arbitrarily complex, it is likely to lead to overfitting and it is equally likely that the rules generated over different splits of the dataset will share a very low degree of similarity, in this sense making the combination of those more difficult. In order to prevent this, in one embodiment, RGE 602 can explicitly constraint some of the hyper-parameters of the model, e.g., in the case of trees, RGE 602 could constrain the maximum depth or the maximum number of leaves. In a second embodiment, RGE 602 can empirically estimate those hyper-parameters by means of approaches like hyper-opt, grid-search, and others, where the objective of the optimization would be to guarantee that rules derived from the models generated over multiple splits would be sufficiently similar to each other and fulfill a minimum level of similarity, making the models as precise as possible.

In further embodiments, device labeler 508 may also include a rule validation module 604 that allows the users to validate and, optionally, update rules generated by RGE 602 via UI 610. To this end, the active labeling mechanisms described previously, which offers the user the ability to visualize clusters of devices that are very similar and provide a label for all of them at once, can be further extended. Notably, in some cases, the user may now also visualize the rule generated by RGE 602 for this cluster (e.g., cluster 504) and may accept or reject it with some additional feedback. More specifically, rule validation module 604 may send rule data 612 to UI 610 regarding the rule generated by RGE 602 and, in turn, receive feedback 614 from the user regarding the proposed rule. This can be performed, for example, in conjunction with RGE 602 requesting a label from the user for cluster 504, through active labeling, to generate the rule.

In one embodiment, the user can provide feedback 614 to rule validation module 604 by choosing one or more options among some predefined set of possible feedback, for example:
[ ] Rule is too complicated (as in, there are too many conditions)
[ ] Rule is too simplistic (as in, the conditions presented are too general)
[ ] Rule is allowing different manufacturers In another embodiment, rule validation module 604 may allow the user of UI 610 to modify the rule generated by RGE 602 on-the-fly, either removing some of the conditions in the presented rule or adding some more conditions, to be picked among a series of suggested ones, previously computed by the system. As the user modifies the proposed rule, the accuracy and robustness scores associated with the rule would change with estimates of how the change will impact the rule performance.

In some cases, the user may submit the validated rule at the same time as the cluster label. This collected feedback 614 on the rule will be instrumental to the operation of rules refinement and aggregation engine (RRAE) 606.

In general, RRAE 606 analyses the collected labels, rules, and rules' feedback from RGE 602 and rule validation module 604, to further refine the rule generated by RGE 602 into a finalized device classification rule 512. RRAE 606 may perform this rule refinement in two stages, as detailed below.

First, in case the proposed rule is rejected via UI 610, and feedback 614 is provided back to rule validation module 604, RRAE 606 may use hints contained in feedback 614 to refine the rule. For example, in one embodiment the provided feedback 614 can come in the form of a comment selected among a fixed set of options, e.g. say the specific feedback is "The rule is too complex, there are too many conditions," then RRAE 606 will prune the originally generated rule.

In a second embodiment, the collected feedback 614 could come in the form of a user-modified rule, in which case, the role of RRAE 606 would be to compute the actual performance of the new rule and possibly find an interpolation between the originally generated rule and the user-modified one that maximizes performance. The feedback 614 may also be integrated in a database to adjust how RGE 602 generating rules for this user in the future. Indeed, if the user is generally finding the rules generated by RGE 602 too complex, all future rules may be simplified, thus adjusting the system globally.

RRAE 606 may also try to merge rules that refer to the same device type. This can be achieved by looking at the labels provided across all clusters. To better understand why this step might sometimes be needed, it is important to understand that the clustering algorithm used by clustering module 502 can generate multiple clusters for devices belonging to the same device type. As a matter of fact, the clustering may end up separating devices that are actually the same device type into two or more clusters. This may occur because of different traffic behavior, different versions or other subtle differences. In this context, the role of RRAE 606 might be to merge multiple rules coming from different clusters that have been labeled with the same device type.

In one embodiment, the rule merging by RRAE 606 could be as simple as concatenating all of the individual clusters' rules by means of the logical OR operator, to generate a finalized device classification rule 512.

In another embodiment, RRAE 606 can take more sophisticated approaches, to merge rules. For example, in case rules are generated by RGE 602 from trees, it may be possible to merge rules by means of principled approaches for merging decision trees. Not only, once all the trees are merged, the final tree (corresponding to the final rule) could be pruned, resulting in a simpler rule. Note also that it would be important to track the performance of the final rule as it gets pruned, making sure the pruning keeps going only until a certain minimum required precision is hit.

In one last step, RRAE 606 may submit the so obtained rules to URD 608, thereby extending the knowledge base and allowing for the cross-system deployment and comparison of device classification rules. For example, by leveraging URD 608, a rule 512 generated for a newly seen device type could be used in other networks to label devices of the same type. Similarly, URD 608 can be used to compare rules generated across different deployments, to help further refine the rules and/or resolve conflicts.

A working prototype of the above rule generation and validation techniques was constructed. To further illustrate the workings of these techniques, the prototype generated a first cluster, Cluster A, that included 91 devices as follows:
Common attributes:
OUI: Cisco Systems, Inc (100.0%)
isHTTPServer: http (1.098%)
networkElementType: Device Type #All Device Types #WS-C4510RE (100.0%)
DHCPClassIdentifier: Cisco Systems, Inc. IP Phone CP-8865 (100.0%)
CDPPlatform: Cisco IP Phone 8865 (100%)
CDPVersion: sip8845_65.12-1-1SR1-4.loads (98.90%)
DHCPParameterRequestList: 1, 42, 66, 6, 3, 15, 150, 35 (100.0%)
Accordingly, the prototype generated the following rule for Cluster A:
{DHCP-fingerprint=="1, 42, 66, 6, 3, 15, 150, 35"}
AND
{
{DHCP-Class-ID=="Cisco Systems, Inc. IP Phone CP-8865"}
OR
{CDP-Cache-Platform=="Cisco IP Phone 8865"}
}

The above rule exhibits both a robustness score and precision score of 100%. Thus, we can assume that the user would accept the rule and provide as a label the following:
Label: "Manufacturer: Cisco Systems Inc., Model: IP Phone CP-8865"

The prototype also generated a second cluster, Cluster B, that included 195 devices, as follows:
Common attributes:
OUI: Cisco Systems, Inc (100.0%)
isHTTPServer: http (4.102%)
networkElementType: Device Type #All Device Types #WS-C4510RE (100.0%)
DHCPClassIdentifier: Cisco Systems, Inc. IP Phone CP-8865 (100.0%)
CDPPlatform: Cisco IP Phone 8865 (100%)
CDPVersion: sip8845_65.12-1-1SR1-4.loads (89.74%)
DHCPParameterRequestList: 1, 3, 6, 15, 35, 66, 150, 2, 7, 42, 43, 58, 59, 159, 160 (100.0%)
From the above cluster, the prototype generated the following rule for Cluster B:

```
{DHCP-fingerprint = = "1, 3, 6, 15, 35, 66, 150, 2, 7, 42, 43, 58, 59, 159,
160"}
AND
{
    {DHCP-Class-ID = = "Cisco Systems, Inc. IP Phone CP-8865"}
    OR
    {CDP-Cache-Platform = = "Cisco IP Phone 8865"}
}
```

The above rule for Cluster B also exhibits robustness and precision scores of 100%. Thus, we can also assume that the user will accept the rule and provide the following label:

Label: "Manufacturer: Cisco Systems Inc., Model: IP Phone CP-8865"

Given the above reported rules and labels from UI 610, RRAE 606 can easily figure out by inspecting the rules that those rules refer to the same device type (e.g., by matching the provided labels). By analyzing the exact conditions and the specific structure of the two rules, RRAE 606 can finally produce the final rule 512 and its stats, as follows, which will be eventually deployed to URD 608:

```
{
    {DHCP-fingerprint = = "1, 42, 66, 6, 3, 15, 150, 35"}
OR
    {DHCP-fingerprint = = "1, 3, 6, 15, 35, 66, 150, 2, 7, 42, 43, 58, 59,
    159, 160"}
}
AND
{
    {DHCP-Class-ID = = "Cisco Systems, Inc. IP Phone CP-8865"}
    OR
    {CDP-Cache-Platform = = "Cisco IP Phone 8865"}
}
```

Referring again to FIG. 5, while the above approaches introduce an approach to generate device classification rules 512, another important factor that can influence the robustness and accuracy of the resulting rule 512 is how the devices are clustered by clustering module 502.

In some cases, the clustering algorithm of clustering module 502 can be optimized without ground truth (i.e., the type of the observed devices). The key idea behind this is that an effective clustering algorithm must trade off a notion of stability (that is, devices clustered together at time t shall remain clustered together at time t+1, t+2, . . . ) and richness (that is, different devices shall be grouped into different clusters). More specifically, the learning system can utilize any stable attributes of the devices observed on a real network (e.g., MAC address, OUI) in order to optimize the feature representation used for clustering these devices. In turn, clustering module 502 may combine a reconstruction loss, which tends to favor very detailed and device-specific representations, and a classification loss, which forces the representation to remain stable across time and across devices that share the same stable attributes.

Still the main challenge comes from the fact that, while providing more stability, large clusters will group more (potentially different) devices, thus yielding less accurate labels. On the other hand, small clusters lead to more accurate (specific) labels at the cost of possibly less stability or generalization power and more work required from the user to provide labels (since there are more clusters).

Figure 7:
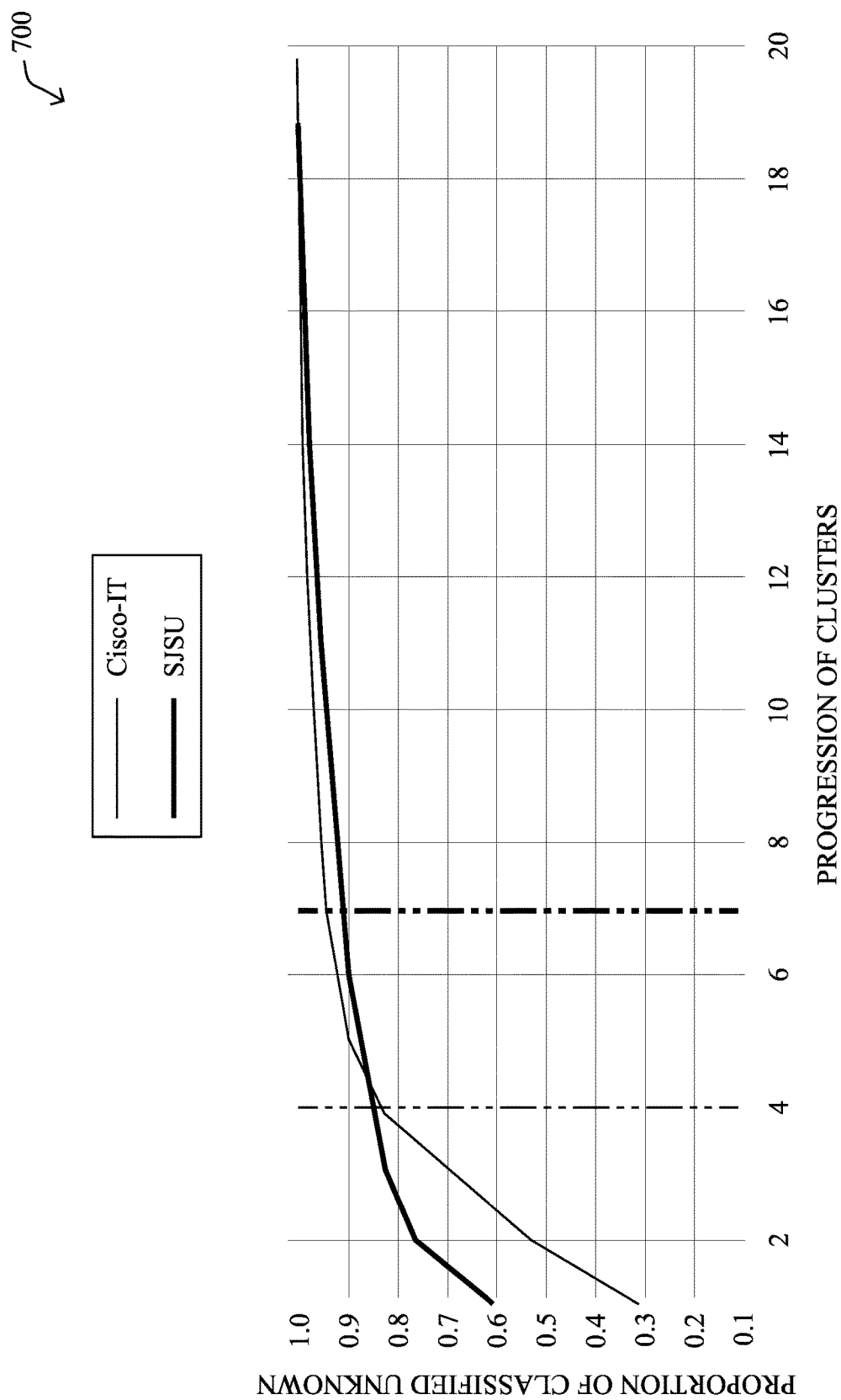
FIG. 7 illustrates an example plot showing the percentage of unknown devices in a network.

FIG. 7 illustrates an example plot 700 that shows the proportion of unknown devices comprised by the first 20 clusters by size that were generated by the prototype. As shown, it can be seen that the top 4 clusters actually cover more than 80% of the unknown devices in the 'Cisco-IT' test network. Similarly, the top 7 clusters comprised more than 90% of the unknown devices in the 'SJSU' test network.

Accordingly, further aspects of the techniques herein introduce an approach where large clusters are potentially and incrementally broken down based on the characteristics of the devices in the cluster according to user input. In contrast with an approach that tries to optimize for stability and richness, the proposed approach specifically optimizes for large clusters, with the known effect that large clusters tend to regroup different devices while bringing great stability.

Figure 8:
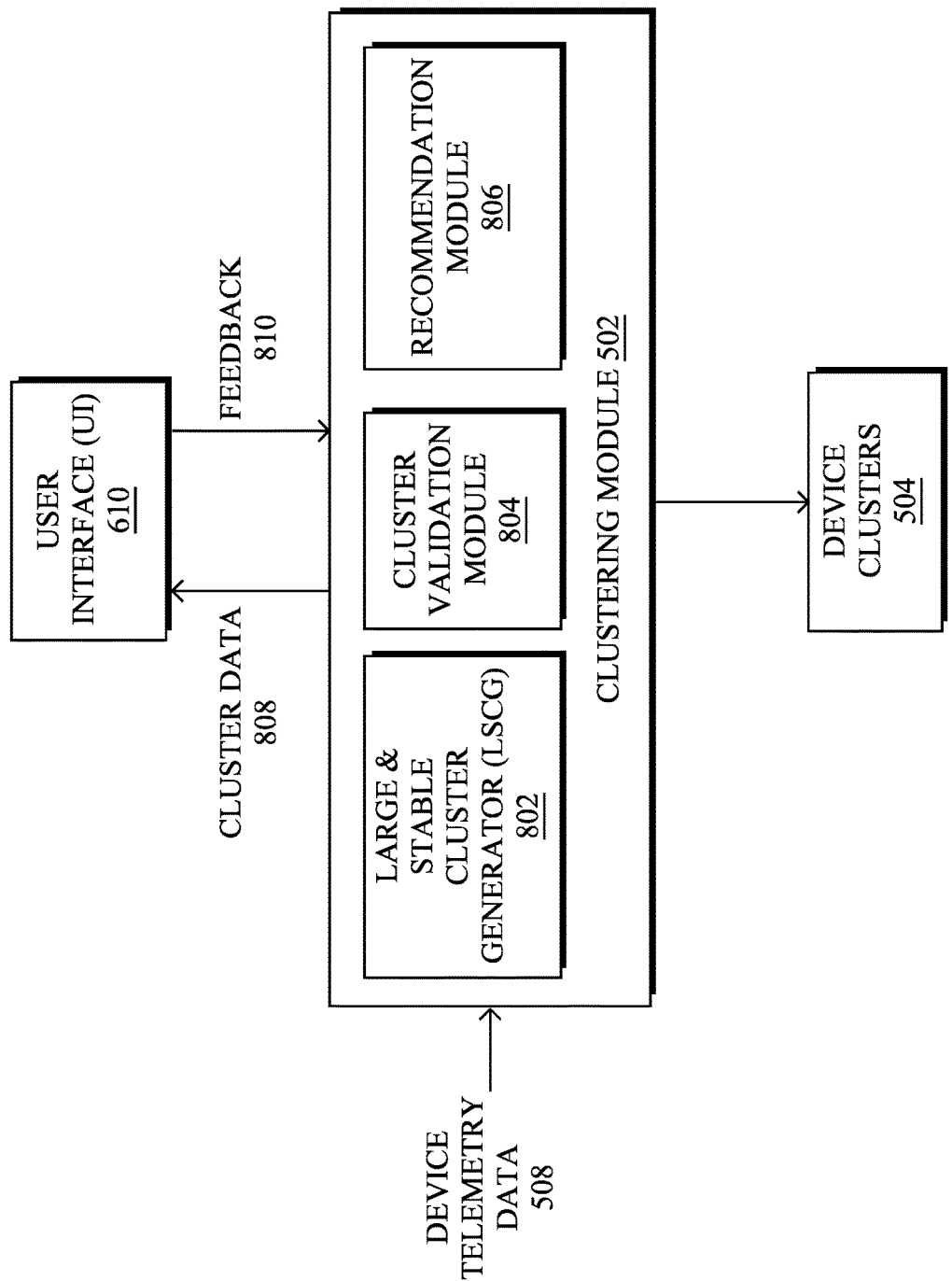
FIG. 8 illustrates an example architecture for refining device clusters.

FIG. 8 illustrates an example architecture 800 for refining device clusters, according to various embodiments. At the core of architecture 800 may be clustering module 502, described previously with respect to FIG. 5, which is responsible for generating device classification rule(s) 512. As shown, device labeler 506 may comprise any or all of the following components: a large and stable clusters generator (LSCG) 802, a cluster validation module 804, and/or a recommendation module 806. The components 802-806 may be implemented either on a single device or in a distributed manner, in which case the combined devices may be viewed as a singular device for purposes of implementing the techniques herein. Further, the functionalities of the components of architecture 800 may also be combined, omitted, or implemented as part of other processes, as desired.

In various embodiments, large and stable clusters generator (LSCG) 802 is configured to generate large, stable clusters of devices based on device telemetry data 508. In one embodiment, LSCG 802 could base the repartition of the devices into large clusters on a simple look up of some fundamental properties of the devices, such as their OUIs, their operating systems, or other very stable attributes associated to the devices themselves, and unrelated to the behavior of the user operating the devices. In this case, LSCG 802 may group/cluster devices based solely on the values taken by one or more key attributes. For example, considering only the OUI, LSCG 802 may generate one cluster for all "Apple Inc." devices, one for all "Samsung Electronics" devices, and so on.

In a second embodiment, LSCG 802 could rely on a clustering algorithm explicitly optimized to achieve large, stable clusters. LSCG 802 could, for example, use a density-based approach, such as DBSCAN, OPTICS or others, which allow for explicitly optimizing for large clusters. Those algorithms mentioned above rely on one key parameter, referred to in the literature as MinSamples, the minimum number of samples required in each cluster. In this case, when optimizing the hyperparameters by means of approaches such as, grid search, Hyperopt, etc., one could guarantee larger clusters by limiting the allowed values for MinSamples to be larger than a predetermined large value V. In this way, LSCG 802 could require that the clusters have a large minimum size, while still allowing any other parameter to be optimized with respect to some other metric of interest. For example, LSCG 802 could maximize the purity of clusters, in case labels for the devices are available. Alternatively, LSCG 802 could maximize the numbers of clusters, provided they all contain a number of devices larger than the above specified value V.

Another potential component of architecture 800 is cluster validation module 804 that allows for user input so as to specify clusters for which greater granularity (and thus accuracy) is required, according to various embodiments. For example, cluster validation module 804 may provide cluster data 808 to UI 610 and, in turn, receive feedback 810 from the user of UI 610 regarding the clustering approach.

In one embodiment, cluster validation module 804 may identify clusters from LSCG 802 that require greater granularity using a policy-based engine. For example, feedback 810 for the cluster data 808 of a large cluster may include that all devices matching a specific OUI value should be subject to clustering using an objective function whose objective is to optimize accuracy. Just for the sake of illustration, a network administrator using UI 610 may require an approach leading to more accurate clusters (at the risk of having many clusters to label with potential instability) for devices related to IoT (critical devices), whereas grouping all Apple devices may be perfectly acceptable, in which case grouping all Apple devices into a single cluster (with MacBook, iPhone, iPad, . . . ) may be perfectly acceptable.

In a second embodiment, cluster validation module 804 may allow the user of UI 610 to manually tag the cluster that offers a simple and intuitive workflow for this task, via feedback 810. When inspecting a cluster, cluster validation module 804 could provide additional context related to several devices in the cluster (potentially at the edge of the cluster) as part of cluster data 808, in order for the user of UI 610 to instruct clustering module 502 via feedback 810 to break up the cluster further. For instance, the user may provide as feedback 810 a given attribute value or a combination thereof to select devices to be clustered separately.

In another embodiment, cluster validation module 804 may itself make a smart selection of devices in the clusters so as to select a set of N devices in a cluster along with the additional context, while trying to maximize the intra-cluster distance between those N candidates, or the distance to the centroid, etc. This can be achieved by using a clustering algorithm that provides hierarchical structures, such as OPTICS.

Such a break-up approach could continue until required by the user of UI 610 via feedback 810. Note that a user may require to merge clusters back, if the label accuracy has not dramatically improved with the cluster break-up, or if the new set of clusters leads to too much instability. Indeed, depending on the features from device telemetry data 508 used for clustering, devices may be subject to instability (e.g., moving from one cluster to another as features tend to vary).

Upon performing cluster break-up, cluster validation module 804 may provide some metrics related to the inter-cluster movements resulting from the cluster break-up back to UI 610. The user may then decide to automatically regroup the clusters, making a tradeoff between improved accuracy of the labels and lack of stability. Another criterion might be related to the number of new clusters resulting from the cluster break-up.

Cluster validation module 804 may also allow further refinements in the re-grouping only to a point that makes sense, in further embodiments. That is, cluster validation module 804 may offer the user of UI 610 the ability to further refine the clustering, as indicated in cluster data 808, when the number N of newly generated clusters is below a defined threshold. Notably, too high a number of clusters implies that the clusters are too small, with the extreme case being clusters that include only one device. In other words, the number of resulting new clusters N may be not worth the gain in terms of label accuracy. Thus, a further function of cluster validation module 804 is to estimate an upper bound UB for the number of refined sub-clusters N obtained in the progressive break-up of an original large stable cluster.

In one embodiment, cluster validation module 804 may estimate UB as being proportional to the number of samples in the original big cluster from LSCG 802. For example, say UB is fixed to be 5% of the number of devices in the large stable cluster. In this case, consider a large stable cluster C which groups 12,000 devices, UB may be equal to 12,000× 0.05=600, meaning that cluster validation module 804 will only allow for the refining of the clustering until 600 new clusters are generated. The maximum number of clusters allowed being limited to UB=600 implies that clustering module 502 allows, at its finest regrouping, to have an average cluster size of 12,000/600=20 devices.

In another embodiment, cluster validation module 804 could impose a minimum number of devices per cluster, thus indirectly inducing a maximum number of clusters UB.

Another component of architecture 800 may be recommendation module 806 that takes as input the recommendations from feedback 810 across all deployments and/or UIs, store them. In turn, recommendation module may augment the cluster data 808 provided to UI 610 with suggested cluster break-ups/divisions as a function of previous choices. Indeed, it is likely that different users have similar policy and security requirements.

In another embodiment, aggregated statistics about cluster break-ups in different regions of the space may be retrofitted to the clustering algorithm of LSCG 802 (e.g., DB-SCAN, OPTICS), to optimize its parameters so that the resulting clusters match closely the structure suggested by user-defined break-ups.

Said differently, the above clustering mechanism introduces a hierarchical approach whereby unknown devices are first grouped into a rough set of larges clusters, optimizing for stability of the cluster assignments. In a second phase, clusters requiring more accurate labels (according to policies and/or user input) may be broken down using a different objective function so as to refine labels and improve accuracy. The user decision on whether to break a cluster up may be eased by performing automatic cluster inspection, selecting candidate devices in a cluster and providing additional context to the user. Mechanisms are also specified to perform automatic cluster regrouping should high instability and/or lack of label accuracy improvement be detected.

Figure 9:
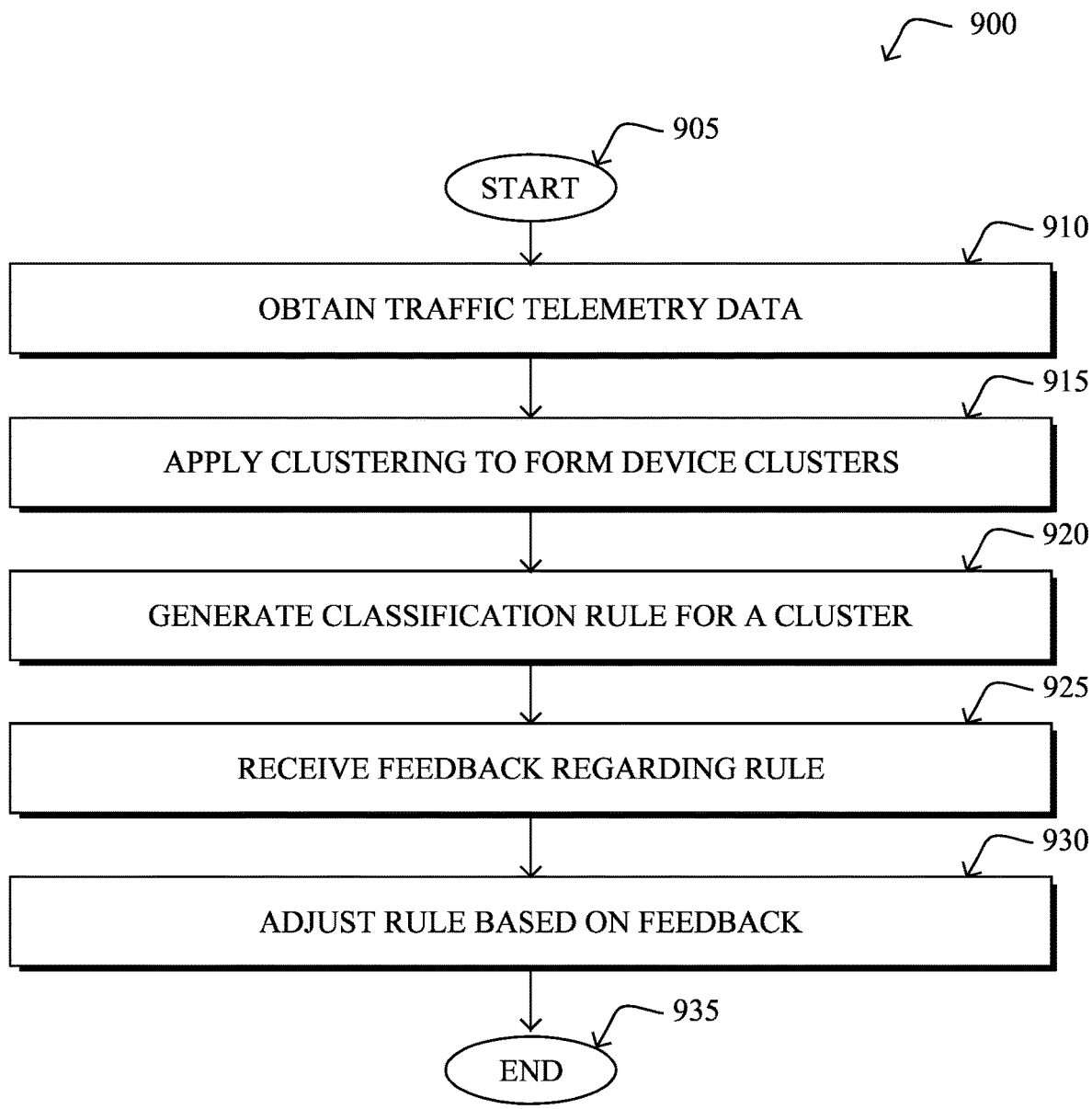
FIG. 9 illustrates an example simplified procedure for generating a device classification rule.

FIG. 9 illustrates an example simplified procedure for generating a device classification rule, in accordance with one or more embodiments described herein. For example, a non-generic, specifically configured device (e.g., device 200) may perform procedure 900 by executing stored instructions (e.g., process 248), to provide a device classification service to one or more networks. The procedure 900 may start at step 905, and continues to step 910, where, as described in greater detail above, the device classification service may obtain traffic telemetry data for a plurality of devices in a network. For example, the telemetry data may indicate the features/characteristics of the traffic sent by the devices such as, but not limited to, the protocols used, packet statistics (e.g., size, etc.), timing information, endpoint information (e.g., destination port, address, etc.), and/or any other information that can be obtained through inspection of the traffic.

At step 915, as detailed above, the device classification service may apply clustering to the traffic telemetry data, to form device clusters. As would be appreciated, doing so results in clusters of devices that exhibit similar traffic behaviors (e.g., the protocols used, timing, etc.). In some embodiments, the service may perform this step iteratively by applying a first clustering approach to the traffic telemetry data, to form a first set of device clusters, providing data regarding one of the device clusters in the first set to a user interface, receiving feedback from the user interface regarding the device cluster in the first set that indicates that the cluster should be broken up, and applying a second clustering approach to the traffic telemetry data, to form a second set of clusters, wherein the second set of clusters comprises more device clusters than that of the first set. For example, the first and second clustering approaches may use different objective functions, with the first creating fewer, but larger clusters, than that of the second.

At step 920, the device classification service may generate a device classification rule based on a particular one of the device clusters, as described in greater detail above. In general, a device classification rule may comprise any number of conditions that need to be met. For example, one such condition may specify the DHCP parameters that are common to the cluster. Such a rule can then be used to assign a device type label to a device in the network based on the traffic telemetry data associated with that device (e.g., if the characteristics of its traffic match the rule). For example, the service may leverage active labeling to associate a device type label to the rule and then use the rule to classify new devices in the network. Such a label may, for example, indicate one or more of: a manufacturer of the device, a model of the device, or a version associated with the device.

At step 925, as detailed above, the device classification service may receive feedback from a user interface regarding the device classification rule. Such feedback may, for example, indicate that the rule has too many conditions (e.g., the rule is too complicated), the rule has too few conditions (e.g., the rule is too simplistic), or the rule allows for different device manufacturers, which could lead to the misclassification of devices.

At step 930, the device classification service may adjust the device classification rule based on the received feedback, as described in greater detail above. In some cases, for example, this may entail the device adding or removing conditions from the rule. In further embodiments, the service may also merge the rule with another existing rule, to form a merged rule. This may be performed in the case of both rules referring to the same device type (label), for example. Procedure 900 then ends at step 935.

Figure 10:
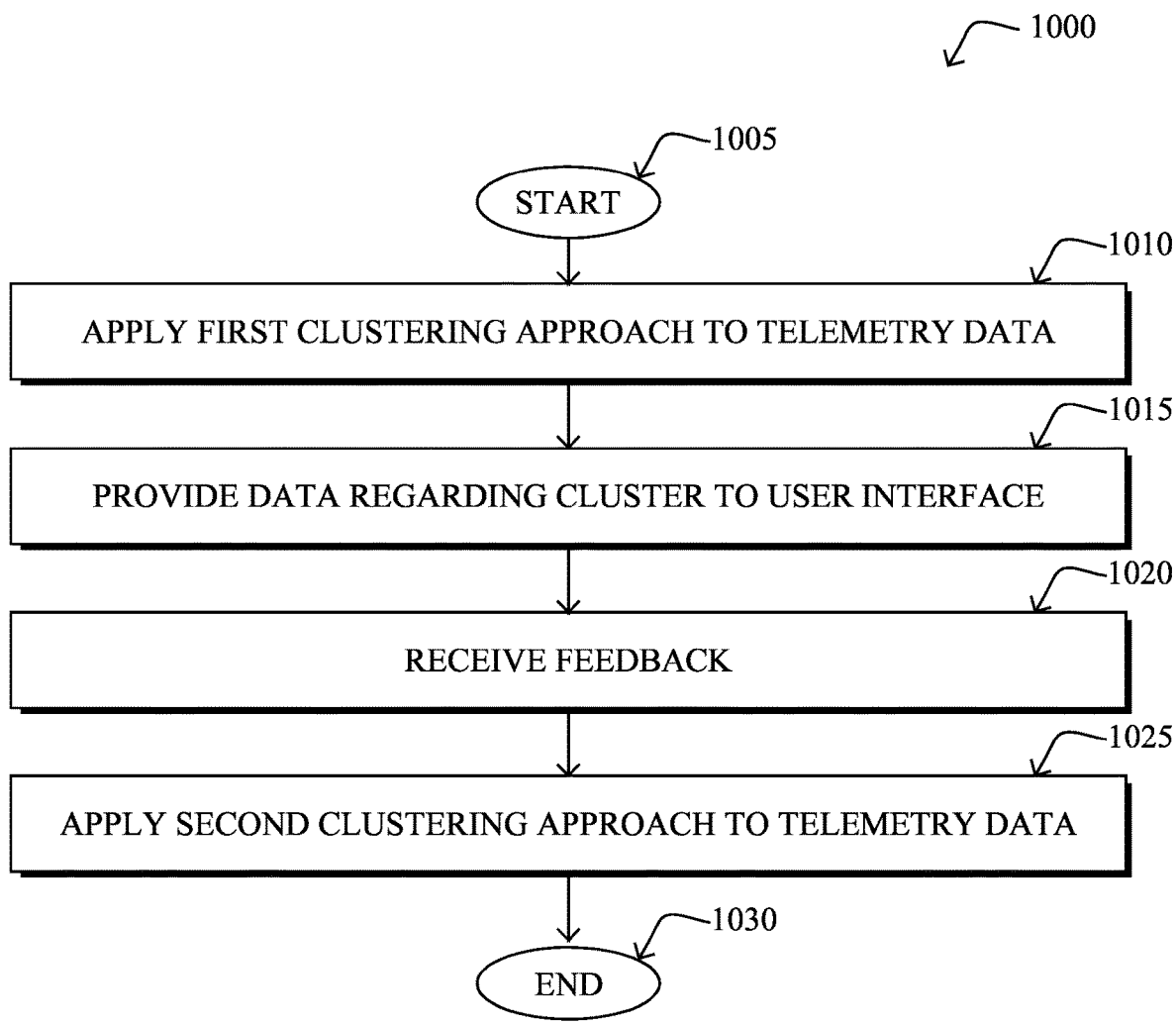
FIG. 10 illustrates an example simplified procedure for adjusting a device cluster.

FIG. 10 illustrates an example simplified procedure for adjusting a device cluster, in accordance with one or more embodiments described herein. For example, a non-generic, specifically configured device (e.g., device 200) may perform procedure 1000 by executing stored instructions (e.g., process 248), to provide a device classification service to one or more networks. The procedure 1000 may start at step 1005, and continues to step 1010, where, as described in greater detail above, the service may apply a first clustering approach to the traffic telemetry data, to form a first set of device clusters. For example, the device may attempt to first form the largest device clusters possible that are still stable.

At step 1015, as detailed above, the device classification service may provide data regarding one of the device clusters in the first set to a user interface. In some instances, this data may indicate the attributes of the devices in the cluster, such as the various features/characteristics of their traffic. In one embodiment, the data may also include a recommendation that one of the clusters should be broken up, such as based on prior user feedback.

At step 1020, the device classification service may receive feedback from the user interface regarding the device cluster in the first set that indicates that the cluster should be broken up, as described in greater detail above. Indeed, while large clusters may be desirable, increased cluster granularity (e.g., smaller, more numerous clusters) may also lead to greater accuracy of any resulting classification rule from the cluster.

At step 1025, as detailed above, the device classification service may apply a second clustering approach to the traffic telemetry data, to form a second set of clusters. In various embodiments, the second set of clusters comprises more device clusters than that of the first set, meaning that the second set comprises clusters of greater granularity than that of the first set. In general, the first and second approaches may differ by one or more of: their parameters (e.g., objective functions, thresholds, etc.), their input datasets, and/or their clustering algorithms. For example, the second clustering approach may use a different objective function than that of the first, to more finely cluster the devices. Procedure 1000 then ends at step 1030.

It should be noted that while certain steps within procedures 900-1000 may be optional as described above, the steps shown in FIGS. 9-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1000 are described separately, certain steps from each procedure may be incorporated into each other procedure, and the procedures are not meant to be mutually exclusive.

The techniques described herein, therefore, allow for learning robust and accurate device classification rules. In addition, the techniques herein can be used to appropriately sized clusters for purposes of rule generation and device labeling.

While there have been shown and described illustrative embodiments that provide for learning device classification rules and classifying devices, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   obtaining, by a device classification service, traffic telemetry data for a plurality of devices in a network;
   applying, by the service, clustering to the traffic telemetry data, to form device clusters;
   generating, by the service, a device classification rule based on a particular one of the device clusters, the device classification rule comprising one or more conditions needed to be met to assign a device label to a device in the network;

receiving, at the service, feedback from a user interface regarding the device classification rule, the feedback indicative of whether the one or more conditions accurately assign the device label to the device; and adjusting, by the service, the device classification rule based on the received feedback, wherein adjusting the device classification rule based on the received feedback comprises:

determining that the rule refers to a plurality device of types; and modifying the one or more conditions so that the device classification rule does not assign the device label to one of the plurality of device types.

2. The method as in claim 1, wherein the adjusted device classification rule is used to assign the device type label to the device in the network based on the traffic telemetry data associated with that device.

3. The method as in claim 2, wherein the device type label is indicative of one or more of: a manufacturer of the device to which the label was assigned, a model of that device, or a version associated with that device.

4. The method as in claim 1, wherein the feedback indicates one of: the rule having too many conditions, the rule having too few conditions, or the rule allowing different manufacturers.

5. The method as in claim 1, further comprising:

deploying, by the service, the adjusted device classification rule to a router or switch, wherein the router or switch uses the adjusted device classification rule to classify a particular device.

6. The method as in claim 1, further comprising:

providing, by the service, the adjusted device classification rule for storage by a cloud-based unified rule database.

7. The method as in claim 1, further comprising:

receiving, by the service, additional traffic telemetry data for the plurality of devices in the network; and applying, by the service, subsequent clustering to the additional traffic telemetry data, to form additional device clusters at a periodic time or a predefined time.

8. An apparatus, comprising:

one or more network interfaces to communicate with one or more networks;

a processor coupled to the network interfaces and configured to execute one or more processes; and a memory configured to store a process executable by the processor, the process when executed configured to:

obtain traffic telemetry data for a plurality of devices in a network;

apply clustering to the traffic telemetry data, to form device clusters;

generate a device classification rule based on a particular one of the device clusters, the device classification rule comprising one or more conditions needed to be met to assign a device label to a device in the network;

receive feedback from a user interface regarding the device classification rule, the feedback indicative of whether the one or more conditions accurately assign the device label to the device; and adjust the device classification rule based on the received feedback, wherein adjusting the device classification rule based on the received feedback comprises:

determining that the rule refers to a plurality of device types; and modifying the one or more conditions so that the device classification rule does not assign the device label to one of the plurality of device types.

9. The apparatus as in claim 8, wherein the adjusted device classification rule is used to assign the device type label to the device in the network based on the traffic telemetry data associated with that device.

10. The apparatus as in claim 9, wherein the device type label is indicative of one or more of: a manufacturer of the device to which the label was assigned, a model of that device, or a version associated with that device.

11. The apparatus as in claim 8, wherein the feedback indicates one of: the rule having too many conditions, the rule having too few conditions, or the rule allowing different manufacturers.

12. The apparatus as in claim 8, wherein the process when executed is further configured to:

deploy the adjusted device classification rule to a router or switch, wherein the router or switch uses the adjusted device classification rule to classify a particular device.

13. The apparatus as in claim 8 wherein the process when executed is further configured to:

provide the adjusted device classification rule for storage by a cloud-based unified rule database.

14. The apparatus as in claim 8 wherein the process when executed is further configured to:

receive additional traffic telemetry data for the plurality of devices in the network; and apply subsequent clustering to the additional traffic telemetry data, to form additional device clusters at a periodic time or a predefined time.

15. A tangible, non-transitory, computer-readable medium storing program instructions that cause a device classification service to execute a process comprising:

obtaining, by the device classification service, traffic telemetry data for a plurality of devices in a network;

applying, by the service, clustering to the traffic telemetry data, to form device clusters;

generating, by the service, a device classification rule based on a particular one of the device clusters, the device classification rule comprising one or more conditions needed to be met to assign a device label to a device in the network;

receiving, at the service, feedback from a user interface regarding the device classification rule, the feedback indicative of whether the one or more conditions accurately assign the device label to the device; and adjusting, by the service, the device classification rule based on the received feedback, wherein adjusting the device classification rule based on the received feedback comprises:

determining that the rule refers to a plurality of device types; and modifying the one or more conditions so that the device classification rule does not assign the device label to one of the plurality of device types.

16. The computer-readable medium as in claim 15, wherein the adjusted device classification rule is used to assign the device type label to the device in the network based on the traffic telemetry data associated with that device.

17. The computer-readable medium as in claim 16, wherein the device type label is indicative of one or more of:

a manufacturer of the device to which the label was assigned, a model of that device, or a version associated with that device.

18. The computer-readable medium as in claim 15, wherein the feedback indicates one of: the rule having too many conditions, the rule having too few conditions, or the rule allowing different manufacturers.

19. The computer-readable medium as in claim 15, the process further comprising:
- deploying, by the service, the adjusted device classification rule to a router or switch, wherein the router or switch uses the adjusted device classification rule to classify a particular device.

20. The computer-readable medium as in claim 15, the process further comprising:
- providing, by the service, the adjusted device classification rule for storage by a cloud-based unified rule database.

* * * * *

UNITED STATES PATENT AND TRADEMARK OFFICE
CERTIFICATE OF CORRECTION

PATENT NO. : 11,196,629 B2
APPLICATION NO. : 17/142447
DATED : December 7, 2021
INVENTOR(S) : David Tedaldi et al.

Page 1 of 1

It is certified that error appears in the above-identified patent and that said Letters Patent is hereby corrected as shown below:

In the Specification

Column 4, Line 28, please amend as shown:
3.) Site Type C: a site of type B (e.g., types B1, B2 or B3)

Column 5, Line 41, please amend as shown:
bus system 250, and is powered by a power supply 260.

Column 22, Line 54, please amend as shown:
thereof. Accordingly, this description is to be taken only by Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*